(12) United States Patent
Seok

(10) Patent No.: US 10,499,431 B2
(45) Date of Patent: *Dec. 3, 2019

(54) CHANNEL ACCESS METHOD FOR VERY HIGH THROUGHPUT (VHT) WIRELESS LOCAL ACCESS NETWORK SYSTEM AND STATION SUPPORTING THE CHANNEL ACCESS METHOD

(71) Applicant: LG ELECTRONICS INC., Seoul (KR)

(72) Inventor: Yong Ho Seok, Anyang-si (KR)

(73) Assignee: LG ELECTRONICS INC., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 15/708,503

(22) Filed: Sep. 19, 2017

(65) Prior Publication Data

US 2018/0027592 A1 Jan. 25, 2018

Related U.S. Application Data

(63) Continuation of application No. 15/357,438, filed on Nov. 21, 2016, now Pat. No. 9,788,346, which is a
(Continued)

(30) Foreign Application Priority Data

Jun. 18, 2008 (KR) .................. 10-2008-0057246

(51) Int. Cl.
*H04W 4/20* (2018.01)
*H04W 74/08* (2009.01)
(Continued)

(52) U.S. Cl.
CPC ... *H04W 74/0816* (2013.01); *H04W 72/0446* (2013.01); *H04W 74/006* (2013.01)

(58) Field of Classification Search
CPC .. H04W 72/0446; H04W 4/20; H04W 74/006
See application file for complete search history.

(56) References Cited

U.S. PATENT DOCUMENTS

| | | | |
|---|---|---|---|
| 5,721,725 A | 2/1998 | Want et al. | |
| 6,393,032 B1 | 5/2002 | Ikegami | |

(Continued)

FOREIGN PATENT DOCUMENTS

| | | |
|---|---|---|
| JP | 2003-348641 A | 12/2003 |
| JP | 2006-352844 A | 12/2006 |

(Continued)

OTHER PUBLICATIONS

Xu et al., "Performance Comparison between Channel-Bonding and Multi-Channel CSMA", Wireless Communications and Networking Conference, 2007. WCNC 2007, IEEE, Mar. 11, 2007, pp. 406-411.

*Primary Examiner* — Gregory B Sefcheck
*Assistant Examiner* — Jael M Ulysse
(74) *Attorney, Agent, or Firm* — Birch, Stewart, Kolasch & Birch, LLP

(57) ABSTRACT

A method for transmitting data in a wireless communication system, the method includes transmitting, by a first station, a plurality of request to send (RTS) frames to a second station through a plurality of subchannels, each of the plurality of RTS frames being transmitted through a corresponding one of the plurality of subchannels, each of the plurality of subchannels having a 20 megahertz (MHz) bandwidth; receiving, by the first station, at least one clear to send (CTS) frame in response to at least one of the plurality of RTS frames from the second station through at least one idle subchannel of the plurality of subchannels; and transmitting, by the first station, a data frame to the second station after receiving the at least one CTS frame, wherein
(Continued)

each of the plurality of RTS frames includes first channel information related to the plurality of subchannels.

16 Claims, 8 Drawing Sheets

Related U.S. Application Data continuation of application No. 14/800,425, filed on Jul. 15, 2015, now Pat. No. 9,526,114, which is a continuation of application No. 14/579,286, filed on Dec. 22, 2014, now Pat. No. 9,107,222, which is a continuation of application No. 12/999,836, filed as application No. PCT/KR2009/003264 on Jun. 18, 2009, now Pat. No. 8,989,158.

(51) Int. Cl.
*H04W 74/00* (2009.01)
*H04W 72/04* (2009.01)

(56) References Cited

U.S. PATENT DOCUMENTS

| | | | |
|---|---|---|---|
| 7,324,605 B2 | 1/2008 | Maltsev et al. | |
| 8,233,462 B2 | 7/2012 | Walton et al. | |
| 8,289,865 B2 | 10/2012 | Maltsev et al. | |
| 8,305,948 B2 | 11/2012 | Surineni et al. | |
| 8,989,158 B2 | 3/2015 | Seok | |
| 9,107,222 B2 | 8/2015 | Seok | |
| 2004/0071154 A1 | 4/2004 | Wentink | |
| 2004/0196871 A1* | 10/2004 | Terry | H04W 28/06 370/477 |
| 2004/0264504 A1* | 12/2004 | Jin | H04W 74/002 370/469 |
| 2005/0135295 A1 | 6/2005 | Walton et al. | |
| 2005/0141545 A1 | 6/2005 | Fein et al. | |
| 2005/0143125 A1* | 6/2005 | Maltsev | H04L 1/0025 455/557 |
| 2005/0147075 A1 | 7/2005 | Terry | |
| 2005/0152465 A1 | 7/2005 | Maltsev et al. | |
| 2005/0152466 A1 | 7/2005 | Maltsev et al. | |
| 2005/0152473 A1 | 7/2005 | Maltsev et al. | |
| 2005/0208956 A1 | 9/2005 | Takagi et al. | |
| 2005/0285803 A1 | 12/2005 | Iacono et al. | |
| 2006/0055958 A1 | 3/2006 | Kim et al. | |
| 2006/0114826 A1 | 6/2006 | Brommer | |
| 2006/0114867 A1* | 6/2006 | Du | H04W 74/002 370/338 |
| 2006/0221924 A1 | 10/2006 | Yang et al. | |
| 2006/0223541 A1 | 10/2006 | Famolari | |
| 2006/0251098 A1 | 11/2006 | Morioka | |
| 2006/0256737 A1 | 11/2006 | Choi et al. | |
| 2006/0280134 A1 | 12/2006 | Kwon et al. | |
| 2006/0280154 A1 | 12/2006 | Kwon et al. | |
| 2007/0002814 A1 | 1/2007 | Benveniste | |
| 2007/0019592 A1 | 1/2007 | Otsuki | |
| 2007/0076675 A1 | 4/2007 | Chen | |
| 2007/0133490 A1 | 6/2007 | Kwon | |
| 2007/0153731 A1 | 7/2007 | Fine | |
| 2007/0160040 A1 | 7/2007 | Kwon | |
| 2007/0223439 A1 | 9/2007 | Kosai | |
| 2007/0266157 A1 | 11/2007 | Xhafa et al. | |
| 2007/0297353 A1* | 12/2007 | Habetha | H04W 74/02 370/310 |
| 2008/0004076 A1 | 1/2008 | Adachi et al. | |
| 2008/0013496 A1* | 1/2008 | Dalmases | H04W 72/0446 370/336 |
| 2008/0056298 A1 | 3/2008 | Nakayama | |
| 2008/0062922 A1 | 3/2008 | Qi | |
| 2008/0075038 A1 | 3/2008 | Jin et al. | |
| 2008/0089221 A1* | 4/2008 | Bruninghaus | H04L 1/1671 370/203 |
| 2008/0112351 A1 | 5/2008 | Surineni et al. | |
| 2008/0144500 A1 | 6/2008 | Chen et al. | |
| 2008/0144586 A1 | 6/2008 | Kneckt et al. | |
| 2008/0171552 A1* | 7/2008 | Hyon | H04W 72/0406 455/450 |
| 2008/0192644 A1 | 8/2008 | Utsunomiya et al. | |
| 2008/0227403 A1 | 9/2008 | Taki | |
| 2008/0232490 A1 | 9/2008 | Gross et al. | |
| 2008/0273549 A1 | 11/2008 | Orfanos et al. | |
| 2008/0285480 A1 | 11/2008 | Panwar et al. | |
| 2009/0010234 A1 | 1/2009 | Li et al. | |
| 2009/0010275 A1 | 1/2009 | Diepstraten et al. | |
| 2009/0059891 A1 | 3/2009 | Sakoda et al. | |
| 2009/0086706 A1* | 4/2009 | Huang | H04L 1/0026 370/349 |
| 2009/0103501 A1 | 4/2009 | Farrag et al. | |
| 2009/0138603 A1 | 5/2009 | Surineni et al. | |
| 2009/0196180 A1* | 8/2009 | Bahl | H04L 5/0032 370/235 |
| 2009/0232155 A1 | 9/2009 | Benveniste | |
| 2009/0316823 A1 | 12/2009 | Lee et al. | |
| 2010/0046482 A1 | 2/2010 | Sridhara et al. | |
| 2010/0150077 A1 | 6/2010 | Nanda et al. | |
| 2010/0182986 A1 | 7/2010 | Okuike | |
| 2011/0299516 A1 | 12/2011 | Kwon | |
| 2011/0310807 A1 | 12/2011 | Grandhi et al. | |
| 2012/0093085 A1 | 4/2012 | Kwon et al. | |

FOREIGN PATENT DOCUMENTS

| | | |
|---|---|---|
| JP | 2007-60366 A | 3/2007 |
| JP | 2007-67472 A1 | 3/2007 |
| JP | 2007-532040 A | 11/2007 |
| WO | WO 2005/043832 A1 | 5/2005 |
| WO | WO 2005/062536 A2 | 7/2005 |
| WO | WO 2006/092801 A2 | 9/2006 |
| WO | WO 2006/120979 A1 | 11/2006 |
| WO | WO 2007/047757 A1 | 4/2007 |
| WO | WO 2008/068729 A1 | 6/2008 |

* cited by examiner

CHANNEL ACCESS METHOD FOR VERY HIGH THROUGHPUT (VHT) WIRELESS LOCAL ACCESS NETWORK SYSTEM AND STATION SUPPORTING THE CHANNEL ACCESS METHOD

CROSS-REFERENCE TO RELATED APPLICATIONS

This Application is a Continuation of U.S. patent application Ser. No. 15/357,438 filed on Nov. 21, 2016 (now U.S. Pat. No. 9,788,346 issued Oct. 10, 2017), which is a Continuation of U.S. patent application Ser. No. 14/800,425 filed on Jul. 15, 2015 (now U.S. Pat. No. 9,526,114 issued on Dec. 20, 2016), which is a Continuation of U.S. patent application Ser. No. 14/579,286 filed on Dec. 22, 2014 (now U.S. Pat. No. 9,107,222 issued on Aug. 11, 2015), which is a Continuation of U.S. patent application Ser. No. 12/999,836 filed on Dec. 17, 2010 (now U.S. Pat. No. 8,989,158 issued on Mar. 24, 2015), which is the National Phase of PCT International Application No. PCT/KR2009/003264 filed on Jun. 18, 2009, which claims the benefit under 35 U.S.C. § 119(a) to Korean Patent Application No. 10-2008-0057246 filed on Jun. 18, 2008, all of which are hereby expressly incorporated by reference into the present application.

BACKGROUND OF THE INVENTION

Field of the Invention

The present invention relates to a wireless local access network (WLAN), and more particularly, to a channel access mechanism in a very high throughput (VHT) WLAN system and a station supporting the channel access mechanism.

Discussion of the Related Art

With the advancement of information communication technologies, various wireless communication technologies have recently been developed. Among the wireless communication technologies, a wireless local access network (WLAN) is a technology whereby super high-speed Internet access is possible in a wireless fashion in homes or businesses or in a region providing a specific service by using a portable terminal such as a personal digital assistant (PDA), a laptop computer, a portable multimedia player (PMP), etc.

Ever since the institute of electrical and electronics engineers (IEEE) 802, i.e., a standardization organization for WLAN technologies, was established in February 1980, many standardization works have been conducted. In the initial WLAN technology, a frequency of 2.4 GHz was used according to the IEEE 802.11 to support a data rate of 1 to 2 Mbps by using frequency hopping, spread spectrum, infrared ray communication, etc. Recently, the WLAN technology can support a data rate of up to 54 Mbps by using orthogonal frequency division multiplex (OFDM). In addition, the IEEE 802.11 is developing or commercializing standards of various technologies such as quality of service (QoS) improvement, access point (AP) protocol compatibility, security enhancement, radio resource measurement, wireless access in vehicular environments, fast roaming, mesh networks, inter-working with external networks, wireless network management, etc.

In the IEEE 802.11, the IEEE 802.11b supports a data rate of up to 11 Mbps by using a frequency band of 2.4 GHz. The IEEE 802.11a commercialized after the IEEE 802.11b uses a frequency band of 5 GHz instead of the frequency band of 2.4 GHz and thus significantly reduces influence of interference in comparison with the very congested frequency band of 2.4 GHz. In addition, the IEEE 802.11a has improved the data rate to up to 54 Mbps by using the OFDM technology. Disadvantageously, however, the IEEE 802.11a has a shorter communication distance than the IEEE 802.11b. Similarly to the IEEE 802.11b, the IEEE 802.11g realizes the data rate of up to 54 Mbps by using the frequency band of 2.4 GHz. Due to its backward compatibility, the IEEE 802.11g is drawing attention, and is advantageous over the IEEE 802.11a in terms of the communication distance.

The IEEE 802.11n is a technical standard relatively recently introduced to overcome a limited data rate which has been considered as a drawback in the WLAN. The IEEE 802.11n is devised to increase network speed and reliability and to extend an operational distance of a wireless network. More specifically, the IEEE 802.11n supports a high throughput (HT), i.e., a data processing speed of up to 540 Mbps at a frequency band of 5 GHz, and is based on a multiple input and multiple output (MIMO) technique which uses multiple antennas in both a transmitter and a receiver to minimize a transmission error and to optimize a data rate. In addition, this standard may use a coding scheme which transmits several duplicated copies to increase data reliability and also may use the OFDM to support a higher data rate.

Meanwhile, a basic access mechanism of an IEEE 802.11 medium access mechanism (MAC) is a carrier sense multiple access with collision avoidance (CSMA/CA) combined with binary exponential backoff. The CSMA/CA mechanism is also referred to as a distributed coordinate function (DCF) of the IEEE 802.11 MAC, and basically employs a "listen before talk" access mechanism. In this type of access mechanism, a station (STA) listens a wireless channel or medium before starting transmission. As a result of listening, if it is sensed that the medium is not in use, a listening STA starts its transmission. Otherwise, if it is sensed that the medium is in use, the STA does not start its transmission but enters a delay duration determined by the binary exponential backoff algorithm.

The CSMA/CA mechanism also includes virtual carrier sensing in addition to physical carrier sensing in which the STA directly listens the medium. The virtual carrier sensing is designed to compensate for a limitation in the physical carrier sensing such as a hidden node problem. For the virtual carrier sending, the IEEE 802.11 MAC uses a network allocation vector (NAV). The NAV is a value transmitted by an STA, currently using the medium or having a right to use the medium, to anther STA to indicate a remaining time before the medium returns to an available state. Therefore, a value set to the NAV corresponds to a duration reserved for the use of the medium by an STA transmitting a corresponding frame.

One of procedures for setting the NAV is a exchange procedure of a request to send (RTS) frame and a clear to send (CTS) frame. The RTS frame and the CTS frame include information capable of delaying transmission of frames from receiving STAs by reporting upcoming frame transmission to the receiving STAs. The information may be included in a duration filed of the RTS frame and the CTS frame. After performing the exchange of the RTS frame and the CTS frame, a source STA transmits a to-be-transmitted frame to a destination STA.

FIG. 1 is a diagram showing an IEEE 802.11 MAC architecture including a DCF. Referring to FIG. 1, a service of the DCF is used to provide a point coordination function (PCF) and a hybrid coordination function (HCF). The HCF includes an enhanced distributed channel access (EDCA) and an HCF controller channel access (HCCF). The HCF does not exist in an STA not supporting quality of service (QoS). On the other hand, both the DCF and the HCF exist in an STA supporting QoS. The PCF is an arbitrary function in all STAs. Details of the DCF, PCF, EDCA, and HCCF are disclosed in section 9 of the "MAC sublayer function description" in the IEEE 802.11-REVma/D9.0 October 2006 standard, and thus descriptions thereof will be omitted herein. The contents of the above standard are incorporated herein by reference.

With the widespread use of WLAN and the diversification of applications using the WLAN, there is a recent demand for a new WLAN system to support a higher throughput than a data processing speed supported by the IEEE 802.11n. However, an IEEE 802.11n medium access control (MAC)/physical layer (PHY) protocol is not effective to provide a throughput of 1 Gbps or more. This is because the IEEE 802.11n MAC/PHY protocol is designed for an operation of a single STA, that is, an STA having one network interface card (NIC), and thus when a frame throughput is increased while maintaining the conventional IEEE 802.11n MAC/PHY protocol, a resultant additional overhead is also increased. Consequently, there is a limitation in increasing a throughput of a wireless communication network while maintaining the conventional IEEE 802.11n MAC/PHY protocol, that is, a single STA architecture.

Therefore, to achieve a data processing speed of 1 Gbps or more in the wireless communication system, a new system different from the conventional IEEE 802.11n MAC/PHY protocol (i.e., single STA architecture) is required. A very high throughput (VHT) system is a next version of the IEEE 802.11n WLAN system, and is one of IEEE 802.11 WLAN systems which have recently been proposed to support a data processing speed of 1 Gbps or more in a MAC service access point (SAP). The VHT system is named arbitrarily. To provide a throughput of 1 Gbps or more, a feasibility test is currently being conducted for the VHT system using 4×4 MIMO and a channel bandwidth of 80 MHz.

Meanwhile, a data processing speed of 1 Gbps or more, which is set as a target throughput in a VHT system, denotes an aggregate throughput. On the other hand, a target throughput in one-to-one communication between STAs is at least 500 Mbps in the VHT system. This implies that performance or an offered load of an STA supporting VHT (hereinafter, simply referred to as a 'VHT STA') may not exceed 500 Mbps. In a case where the offered load of the VHT STA is less than 1 Gbps (e.g., 500 Mbps), the target throughput of the VHT system cannot be achieved when one VHT STA is allowed to use an entire channel similarly to the conventional channel access method.

In addition, there is a problem in that efficiency is not high in the aforementioned CSMA/CA channel access method used in the IEEE 802.11 WLAN. For example, a data processing speed in a MAC SAP is only 50 to 60% of a data processing speed in a PHY SAP. Therefore, in order to achieve a data processing speed of 1 Gbps or more in the MAC SAP of the VHT system, the data processing speed of the PHY SAP needs to be about 1.5 to 2 times higher than 1 Gbps. However, the conventional IEEE 802.11n PHY technique has difficulty in providing such a processing speed.

SUMMARY OF THE INVENTION

The present invention provides a new channel access method for achieving an aggregate throughput of 1 Gbps or more in a very high throughput (VHT) system.

The present invention also provides a channel access method for allowing simultaneous channel access of a plurality of VHT stations (STAs) in a VHT system.

The present invention also provides a new channel access method for achieving an aggregate throughput of 1 Gbps or more in a medium access control (MAC) service access point (SAP) in a VHT system.

According to an aspect of the present invention, there is provided a channel access method in a very high throughput (VHT) system using a bonding channel consisting of a plurality of subchannels, comprising: transmitting a request to send (RTS) frame by one source station or each of a plurality of source stations to a destination station through any subchannel selected from the plurality of subchannels; and in response to the received RTS frame, transmitting a clear to send (CTS) frame by the destination station to one source station selected from the plurality of source stations through the bonding channel.

According to another aspect of the present invention, there is provided a channel access method in a very high throughput (VHT) system using a bonding channel consisting of a plurality of subchannels, comprising: transmitting a request to send (RTS) frame by a source station to a destination station for each of the plurality of subchannels; and transmitting a clear to send (CTS) frame by the destination station to the source station through a subchannel in which the RTS frame is successfully received.

According to still another aspect of the present invention, there is provided a channel access method in a very high throughput (VHT) system using a bonding channel consisting of a plurality of subchannels, comprising: transmitting a request to send (RTS) frame by one source station or each of a plurality of source stations to a destination station through any subchannel selected from the plurality of subchannels; and in response to the received RTS frame, transmitting a clear to send (CTS) frame by the destination station to one source station selected from the plurality of source stations through the bonding channel, wherein the CTS frame comprises a list of subchannels to be used by the source station that receives the CTS frame to transmit a subsequent frame.

According to still another aspect of the present invention, there is provided a channel access method in a very high throughput (VHT) system using a bonding channel consisting of a plurality of subchannels, wherein a source station transmits a request to send (RTS) frame to a destination station by using any subchannel among the plurality of subchannels or by using each of the plurality of subchannels.

According to still another aspect of the present invention, there is provided a channel access method in a very high throughput (VHT) system using a bonding channel consisting of a plurality of subchannels, wherein a request to send (RTS) frame transmitted by a source station to a destination station comprises a list of subchannels which are desired to be used by the source station among the plurality of subchannels to transmit a subsequent frame.

According to still another aspect of the present invention, there is provided a channel access method in a very high throughput (VHT) system using a bonding channel consisting of a plurality of subchannels, wherein a clear to send (CTS) frame transmitted by a destination station to a receiving station in response to a received request to send (RTS) frame comprises a list of subchannels which are allowed to be used by the source station among the plurality of subchannels to transmit a subsequent frame.

An effective channel access mechanism is provided to improve usage efficiency of a bonding channel consisting of a plurality of subchannels in a very high throughput (VHT)

system using the bonding channel. In particular, according to an embodiment of the present invention, access to another subchannel is allowed not only in a case where one or more VHT stations simultaneously request channel access but also in a case where some of subchannels are used by a legacy station, thereby enabling effective channel access.

DETAILED DESCRIPTION OF THE EMBODIMENTS

Figure 1:
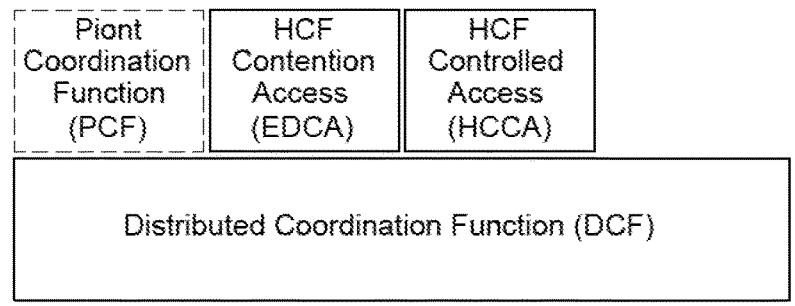
FIG. 1 is a diagram showing an institute of electrical and electronics engineers (IEEE) 802.11 medium access control (MAC) architecture including a distributed coordinate function (DCF).
Figure 2:
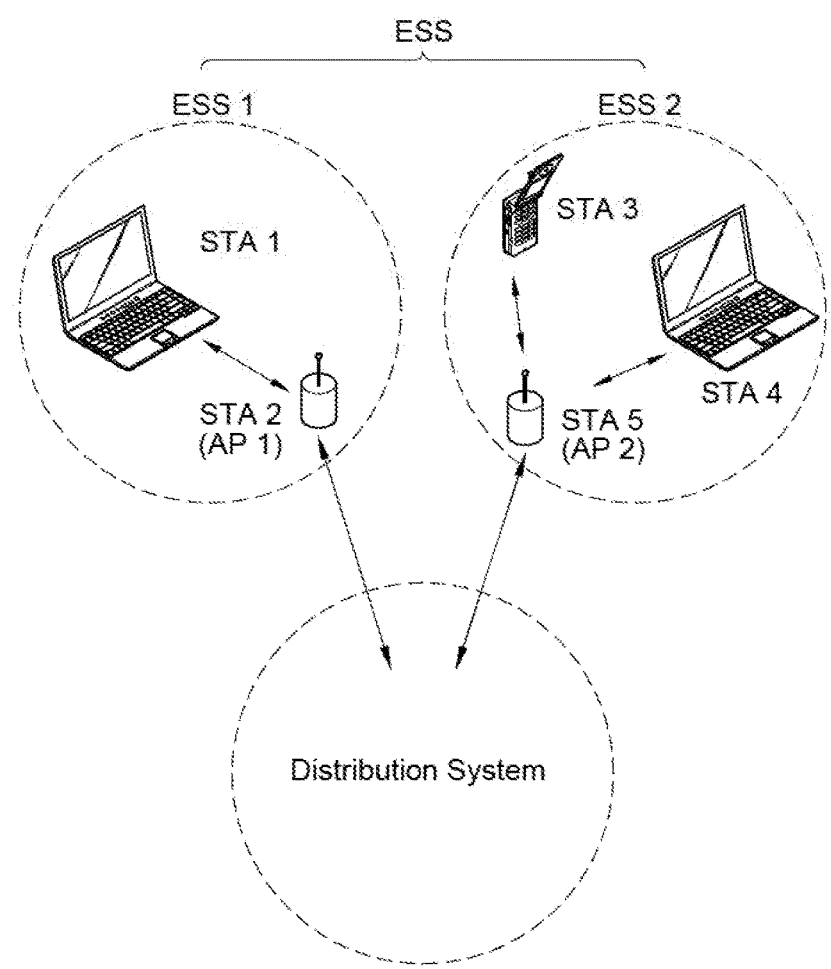
FIG. 2 is a schematic view showing an exemplary structure of a wireless local access network (WLAN) system according to an embodiment of the present invention.

FIG. 2 is a schematic view showing an exemplary structure of a wireless local access network (WLAN) system according to an embodiment of the present invention.

Referring to FIG. 2, the WLAN system includes one or more basis service sets (BSSs). The BSS is a set of stations (STAs) which are successfully synchronized to communicate with one another, and is not a concept indicating a specific region. A very high throughput (VHT) BSS is defined as a BSS that supports a super high-speed data processing speed of 1 GHz or more.

A VHT system including one or more VHT BSSs can use a channel bandwidth of 80 MHz, which is for exemplary purposes only. For example, the VHT system may use a channel bandwidth of 60 MHz or 100 MHz or more. As such, the VHT system operates in a multi-channel environment where a plurality of subchannels having a specific size, e.g., a channel bandwidth of 20 MHz, are included.

The BSS can be classified into an infrastructure BSS and an independent BSS (IBSS). The infrastructure BSS is shown in FIG. 2. Infrastructure BSSs (i.e., BSS1 and BSS2) include one or more STAs (i.e., STA1, STA3, and STA4), access points (APs) which are STAs providing a distribution service, and a distribution system (DS) connecting a plurality of APs (i.e., AP1 and AP2). On the other hand, the IBSS does not include APs, and thus all STAs are mobile STAs. In addition, the IBSS constitutes a self-contained network since connection to the DS is not allowed.

The STA is an arbitrary functional medium including a medium access control (MAC) and wireless-medium physical layer (PHY) interface conforming to the institute of electrical and electronics engineers (IEEE) 802.11 standard, and includes both an AP and a non-AP STA in a broad sense.

A VHT STA is defined as an STA that supports the super high-speed data processing speed of 1 GHz or more in the multi-channel environment to be described below.

The STA for wireless communication includes a processor and a transceiver, and also includes a user interface, a display element, etc. The processor is a functional unit devised to generate a frame to be transmitted through a wireless network or to process a frame received through the wireless network, and performs various functions to control STAs. The transceiver is functionally connected to the processor and is a functional unit devised to transmit and receive a frame for the STAs through the wireless network.

Among the STAs, non-AP STAs (i.e., STA1, STA3, STA4, STA6, STA7, and STA8) are portable terminals operated by users. A non-AP STA may be simply referred to as an STA. The non-AP STA may also be referred to as a wireless transmit/receive unit (WTRU), a user equipment (UE), a mobile station (MS), a mobile terminal, a mobile subscriber unit, etc. A non-AP VHT-STA is defined as a non-AP STA that supports the super high-speed data processing speed of 1 GHz or more in the multi-channel environment to be described below.

The AP (i.e., AP1 and AP2) is a functional entity for providing connection to the DS through a wireless medium for an associated STA. Although communication between non-AP STAs in an infrastructure BSS including the AP is performed via the AP in principle, the non-AP STAs can perform direct communication when a direct link is set up. In addition to the terminology of an access point, the AP may also be referred to as a centralized controller, a base station (BS), a node-B, a base transceiver system (BTS), a site controller, etc. A VHT AP is defined as an AP that supports the super high-speed data processing speed of 1 GHz or more in the multi-channel environment to be described below.

A plurality of infrastructure BSSs can be interconnected by the use of the DS. An extended service set (ESS) is a plurality of BSSs connected by the use of the DS. STAs included in the ESS can communicate with one another. In the same ESS, a non-AP STA can move from one BSS to another BSS while performing seamless communication.

The DS is a mechanism whereby one AP communicates with another AP. By using the DS, an AP may transmit a frame for STAs associated with a BSS managed by the AP, or transmit a frame when any one of the STAs moves to another BSS, or transmit a frame to an external network such as a wired network. The DS is not necessarily a network, and has no limitation in its format as long as a specific distribution service specified in the IEEE 802.11 can be provided. For example, the DS may be a wireless network such as a mesh network, or may be a physical structure for interconnecting APs.

Figure 3:
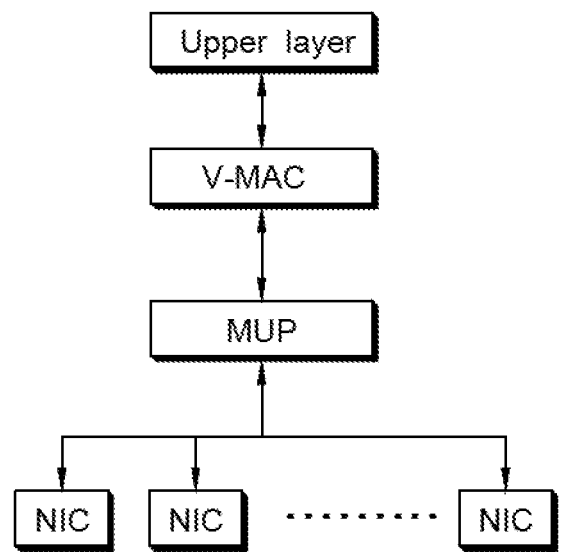
FIG. 3 is a block diagram showing a multi-radio unification protocol (MUP) as an example of a protocol applicable to a very high throughput (VHT) system including a plurality of network interface cards (NICs) each having an independent radio interface.

FIG. 3 is a block diagram showing a multi-radio unification protocol (MUP) as an example of a protocol applicable to a VHT system including a plurality of network interface cards (NICs) each having an independent radio interface.

Referring to FIG. 3, an STA supporting the MUP includes a plurality of NICs. The NICs are separately depicted in FIG. 3, which implies that each NIC independently operates a MAC/PHY module. That is, the NICs are distinctively depicted in FIG. 3 to show that the NICs are logical entities operating according to individual MAC/PHY protocols. Therefore, the plurality of NICs can be implemented with physically distinctive functional entities, or can be implemented by integrating the physical entities into one physical entity.

According to one aspect of the present embodiment, the plurality of NICs can be classified into a primary radio interface and one or more secondary radio interfaces. If a plurality of secondary radio interfaces are present, the secondary radio interfaces can be classified into a first secondary radio interface, a second secondary radio interface, a third secondary radio interface, etc. The classification into the primary interface and the secondary interface and/or the classification of the secondary ratio interface itself may be determined by a policy or may be adoptively determined in consideration of a channel environment.

The plurality of NICs are integrally managed according to the MUP. As a result, the plurality of NICs are externally recognized as if they are one device. For this, the VHT system includes a virtual-MAC (V-MAC). Through the V-MAC, an upper layer cannot recognize that a multi-radio channel is operated by the plurality of NICs. As such, in the VHT system, the upper layer does not recognize the multi-radio channel through the V-MAC. This means that one virtual Ethernet address is provided.

Next, a channel allocation mechanism in a VHT system will be described according to embodiments of the present invention. Although the embodiments described below relate to a VHT system using a bonding channel in which contiguous 4 subchannels having a bandwidth of 20 MHz are combined (i.e., a bonding channel having a channel bandwidth of 80 MHz), this is for exemplary purposes only. The embodiments described below can equally apply to a VHT system including a plurality of subchannels (e.g., 3 or 5 or more subchannels), which is apparent to those skilled in the art. In addition, the embodiments of the present invention are not limited to the VHT system whose subchannel has a bandwidth of 20 MHz.

Figure 4:
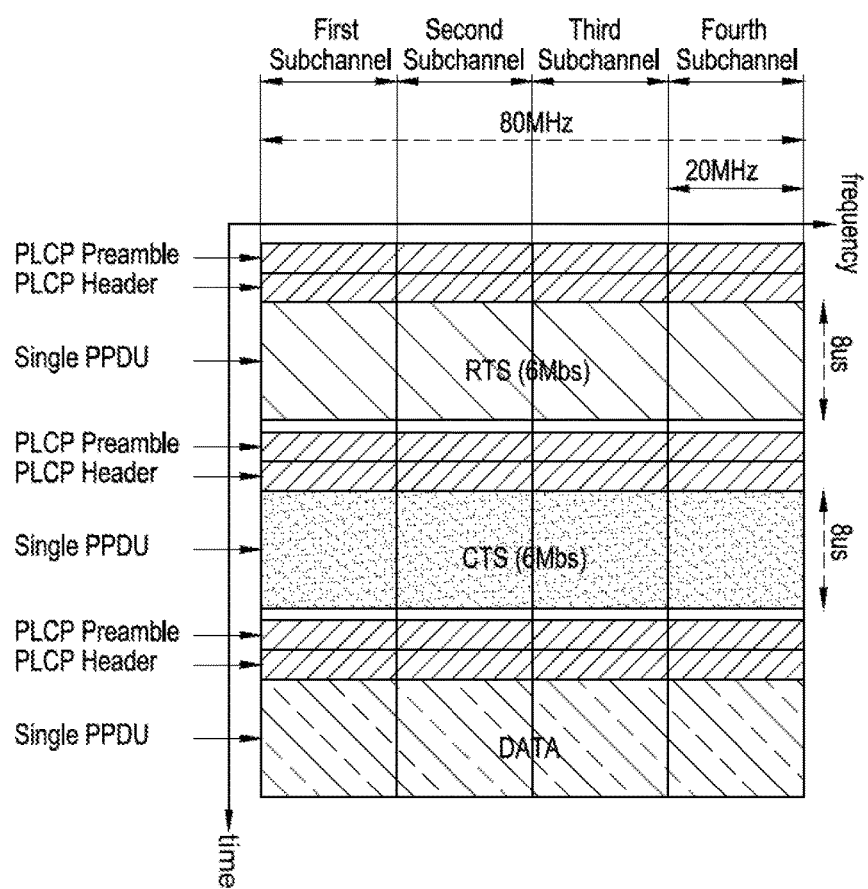
FIG. 4 is a diagram showing a channel access mechanism according to a first embodiment of the present invention.

FIG. 4 is a diagram showing a channel access mechanism in a VHT WLAN system according to a first embodiment of the present invention. In the present embodiment, the conventional channel access mechanism (e.g., enhanced distributed channel access (EDCA) mechanism) is directly used for an entire bonding channel, and it is assumed that a full channel bandwidth is used by only one VHT STA. That is, the entire bonding channel is used to exchange a request to send (RTS) frame, a clear to send (CTS) frame, and data between two VHT STAB performing communication with each other.

Referring to FIG. 4, a source VHT STA or a transmitting VHT STA, which intends to transmit data, transmits an RTS frame by using the entire bonding channel. In FIG. 4, a process of transmitting the RTS frame is indicated by a physical layer convergence procedure (PLCP) preamble, a PLCP header, and a single PLCP protocol data unit (PPDU). Upon receiving the RTS frame, a destination VHT STA or a receiving VHT STA transmits a CTS frame also by using the entire bonding channel. In FIG. 4, a process of transmitting the CTS frame is also indicated by a PLCP preamble, a PLCP header, and a single PPDU.

When the RTS frame and the CTS frame are exchanged by using the entire bonding channel, subsequent data or the like is generally transmitted also by using the entire bonding channel. However, according to an aspect of the present embodiment, the RTS frame and/or the CTS frame may include a list of subchannels to be used for transmission of subsequent data or the like. As such, when the RTS frame and/or the CTS frame include the list of subchannels, a network allocation vector (NAV) is set only for a specific subchannel included in the list, and the source VHT STA transmits the data or the like to the destination VHT STA only through the specific subchannel.

Consequently, upon receiving the CTS frame, the source VHT STA starts transmission of the data or the like to the destination VHT STA according to a predetermined procedure. In FIG. 4, a process of transmitting the data is also indicated by a PLCP preamble, a PLCP header, and a single PPDU. In this case, if the list of subchannels does not exist in the RTS frame and/or the CTS frame, as shown in FIG. 4, the data or the like is transmitted by using the entire bonding channel. Otherwise, if the list of subchannels exists, the data or the like may be transmitted by using all or some of subchannels included in the list.

As described above, according to the first embodiment of the present invention, the RTS frame, the CTS frame, the data frame, etc., are transmitted through the entire bonding channel directly using the channel access mechanism based on the conventional EDCA. As a modification of the first embodiment, a list of subchannels to be used for transmission of the data frame or the like may be included in the RTS frame and/or the CTS frame. If the list of subchannels is included, the source VHT STA can transmit the data frame or the like to the destination VHT STA by using all or some of subchannels of the list.

In a case where the RTS frame and the CTS frame are transmitted by using the entire bonding channel, the RTS frame and the CTS frame are very small in size, and thus a transmission time corresponds to only a few orthogonal frequency division multiplex (OFDM) symbols (e.g., 8 ?s required for transmission of 6 Mbs). Optionally, the transmission time of the RTS frame and the CTS frame may be less than the PLCP preamble and the PLCP header. A network overhead for the RTS frame and the CTS frame is almost negligible.

Figure 5:
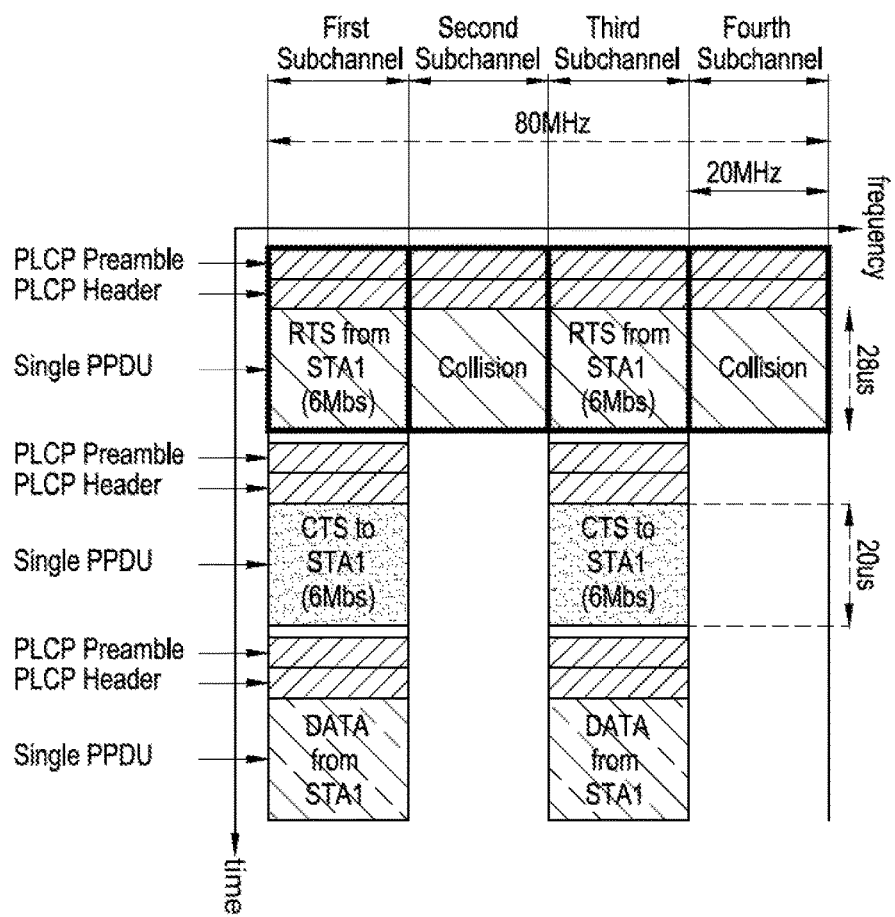
FIG. 5 is a diagram showing a channel access mechanism according to a second embodiment of the present invention.

FIG. 5 is a diagram showing a channel access mechanism in a VHT WLAN system according to a second embodiment of the present invention. The present embodiment is an example of a channel access mechanism for solving a problem of collision with a legacy STA in a VHT system in which a VHT STA coexists with the legacy STA, when the conventional EDCA channel access mechanism is used as in the first embodiment described above. Such a channel access mechanism can also be referred to as, for example, frequency-selective EDCA.

According to the aforementioned first embodiment, an entire bonding channel cannot be used when the collision with the legacy STA occurs, which may result in significant throughput deterioration of the VHT system. If the VHT STA is in use or one or more legacy STAs operates in any subchannel among subchannels to be used, in order for the VHT STA to access to a channel including the subchannel or to access to the entire bonding channel, all subchannels constituting the channel or the bonding channel have to be unoccupied (or idle). That is, the VHT STA can successfully perform channel access only when the collision with the legacy STA does not occur with respect to all subchannels constituting the bonding channel.

According to the present embodiment, a channel access mechanism for transmitting an RTS frame for each subchannel is used to prevent a problem of throughput deterioration caused by the collision with the legacy STA. That is, a source VHT STA transmits the RTS frame for each subchannel instead of transmitting the RTS frame by using the entire bonding channel. If collision occurs with the legacy STA in any subchannel while the RTS frame for each subchannel is transmitted, a destination VHT STA transmits a CTS frame only for a subchannel in which no collision occurs, and as a result, the source VHT STA receives the CTS frame only for the subchannel in which no collision occurs. Further, the source VHT STA transmits data or the like only for a subchannel in which the CTS frame is received.

Referring to FIG. 5, the source VHT STA or the transmitting VHT STA (indicated by 'STA1' in FIG. 5), which intends to transmit data, transmits an RTS frame by using the entire bonding channel. In the present embodiment, the RTS frame is transmitted for each subchannel by regarding each subchannel as an independent channel, instead of regarding the entire bonding channel as one channel. In FIG. 5, a process of transmitting the RTS frame for each subchannel is indicated by a PLCP preamble, a PLCP header, and a single PPDU for each subchannel.

However, according to the present embodiment, among all subchannels, a 2nd subchannel and a 4th subchannel are used by the legacy STA. The 2nd subchannel and the 4th subchannel may be in use by different legacy STAs. Although the 2nd subchannel and the 4th subchannel are used by the legacy STA herein, this is for exemplary purposes only, and thus the embodiment of the present invention is not limited thereto. If the 2nd subchannel and the 4th subchannel are already being used, RTS frames transmitted through these subchannels may be unsuccessfully transmitted due to collision, and a destination VHT STA may successfully receive RTS frames transmitted through a 1st subchannel and a 3rd subchannel.

Upon receiving the RTS frames through all or some of subchannels, the destination VHT STA or the receiving VHT STA transmits a CTS frame for each subchannel by using corresponding subchannels. In FIG. 5, a process of transmitting the CTS frame is indicated by a PLCP preamble, a PLCP header, and a single PPDU in the 1st and 3rd subchannels.

Upon receiving the CTS frame through the 1st and 3rd subchannels, the source VHT STA transmits data or the like by using corresponding subchannels (i.e., the 1st and 3rd subchannels). In FIG. 5, a process of transmitting the data through the 1st and 3rd subchannels is indicated by a PLCP preamble, a PLCP header, and a single PPDU in the 1st and 3rd subchannels.

Figure 6:
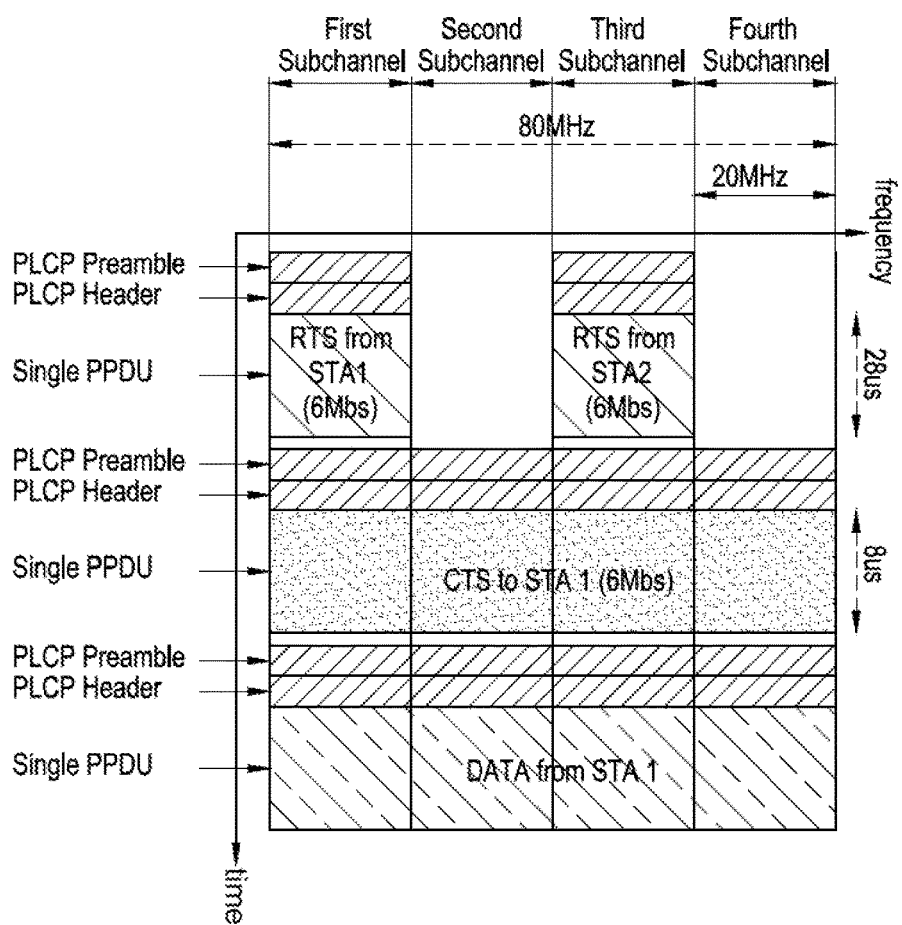
FIG. 6 is a diagram showing a channel access mechanism according to a third embodiment of the present invention.

FIG. 6 is a diagram showing a channel access mechanism in a VHT WLAN system according to a third embodiment of the present invention. The present embodiment is an example of a channel access mechanism for preventing collision between VHT STAB in a VHT system in which the VHT STA coexists with a legacy STA or in a VHT BSS in which only the VHT STA exists. Such a channel access mechanism can also be referred to as, for example, frequency-hopping EDCA.

According to the aforementioned first embodiment, if the legacy STA occupies any one subchannel at a time for transmitting an RTS frame, the VHT STA cannot immediately transmit data or the like by using an entire bonding channel even after the use of the subchannel is finished. That is, only after the legacy STA finishes the use of the subchannel, a procedure of exchanging the RTS frame and a CTS frame can begin. According to the aforementioned second embodiment, the entire bonding channel cannot be used for transmission of data or the like when collision occurs with the legacy STA, and thus there is a disadvantage in that a throughput of the VHT system deteriorates.

According to the present embodiment, a channel access mechanism in which one VHT STA transmits an RTS frame by using only one subchannel is used to prevent a problem of transmission delay on data or the like, which may be caused in the first embodiment, or a problem of deterioration in channel usage efficiency, which may be caused in the second embodiment. More specifically, each VHT STA intending to transmit data or the like transmits an RTS frame by selecting any one subchannel or by using only one subchannel according to a predetermined rule, instead of transmitting the RTS frame by using the entire bonding channel. That is, each VHT STA performs channel access by using an EDCA scheme through selected or predetermined one subchannel. As such, according to the present embodiment, RTS frames are transmitted by using only one subchannel, and thus even if a plurality of VHT STAs simultaneously transmit the RTS frames, collision between the RTS frames can be prevented or avoided.

Upon receiving the RTS frames from one or more VHT STAs, a destination VHT STA or a receiving VHT STA transmits a CTS frame as a response by selecting one of the received RTS frames, that is, by selecting one VHT STA from the VHT STAs transmitting the RTS frames. In this case, the CTS frame can be transmitted through the entire bonding channel or, as in the aforementioned second embodiment, can be transmitted for each corresponding subchannel. In the latter case, the CTS frame is transmitted for each subchannel through the entire bonding channel instead of using only a subchannel identical to the subchannel in which the selected RTS frame is transmitted. In addition, according to the present embodiment, the VHT STA which has received the CTS frame, i.e., the destination VHT STA of the CTS frame, uses the entire bonding channel when intending to transmit data or the like in a subsequent procedure.

Referring to FIG. 6, source VHT STAs or transmitting VHT STAs (indicated by 'STA1' and 'STA2' in FIG. 6), which intend to transmit data, transmit RTS frames through any respective subchannels. For example, this may be a case where backoff timers of the STA1 and the STA2 are simultaneously expired. It is shown in FIG. 6 that the STA1 uses a 1st subchannel and the STA2 uses a 3rd subchannel, which is for exemplary purposes only. According to the present embodiment, preferably, the STA1 and the STA2 transmit the RTS frames by using different subchannels, and the subchannels can be determined without any restriction. When the STA1 and the STA2 transmit the RTS frames by using different subchannels, collision between the RTS frames can be prevented. In FIG. 6, a process of transmitting the respective RTS frames by the STA1 and the STA2 through the different subchannels is indicated by a PLCP preamble, a PLCP header, and a single PPDU in the 1st and 3rd subchannels.

When the destination VHT STA or the receiving VHT STA receives separate RTS frames through 1st and 3rd subchannels among all subchannels, the destination VHT STA or the receiving VHT STA transmits a CTS frame as a response by selecting only one RTS frame. It is shown in FIG. 6 that an RTS frame received from the 1st VHT STA (i.e., STA1) is selected and thus the CTS frame is transmitted to the STA1, which is for exemplary purposes only. In addition, according to the present embodiment, the CTS frame is transmitted through the entire bonding channel. In FIG. 6, a process of transmitting the CTS frame is indicated by a PLCP preamble, a PLCP header, and a single PPDU in the entire bonding channel, and the CTS frame is transmitted to the STA1.

Upon receiving the CTS frame, the STA1 transmits data or the like by using the entire bonding channel. Therefore, according to the present embodiment, channel usage efficiency can be maximized when transmitting data of the like. In FIG. 6, a process of transmitting the data through all subchannels is indicated by a PLCP preamble, a PLCP header, and a single PPDU in the entire bonding channel.

As described in the aforementioned second embodiment and in the present embodiment, if an RTS frame and/or a CTS frame are transmitted by using only one subchannel, a transmission time of the RTS frame and the CTS frame is relatively increased. However, since the RTS frame is small in size, a transmission overhead of the RTS frame is not relatively large. On the other hand, according to the present embodiment, RTS frames are transmitted by using only one subchannel, and thus collision between the RTS frames can be prevented. As a result, according to the present embodiment, a possibility of collision between VHT STAB can be reduced, and thus channel usage efficiency can also be increased to that extent.

Figure 7:
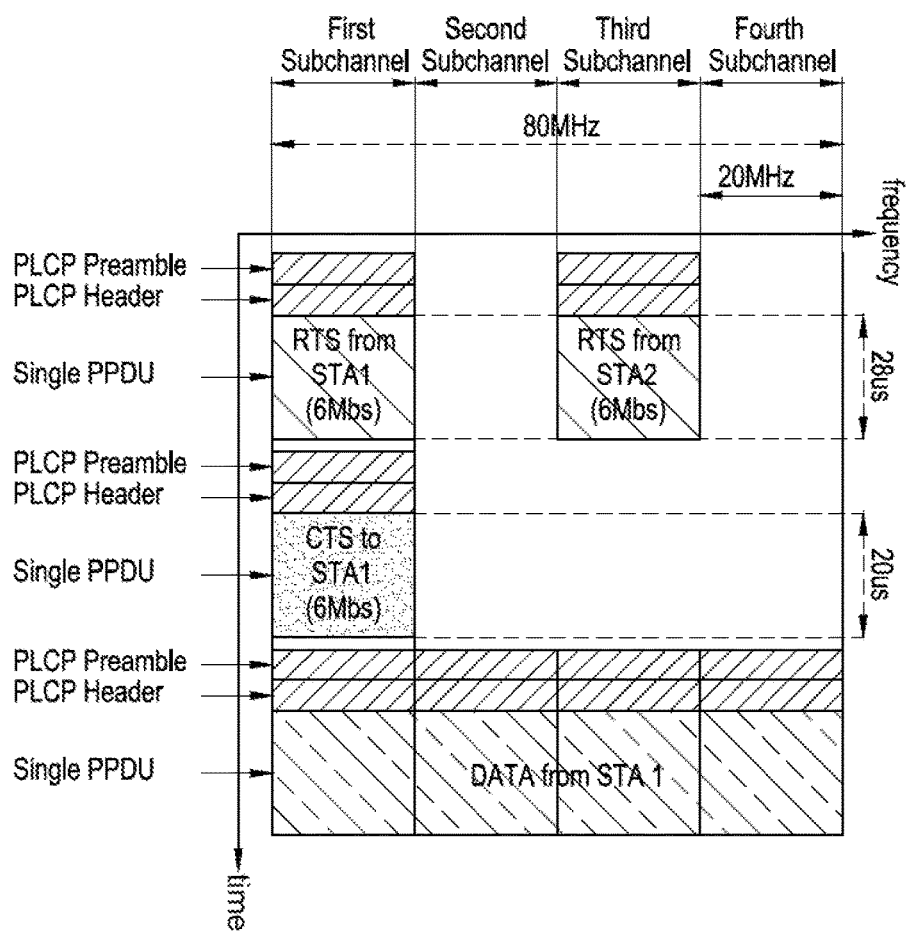
FIG. 7 is a diagram showing a channel access mechanism according to a fourth embodiment of the present invention.

FIG. 7 is a diagram showing a channel access mechanism in a VHT WLAN system according to a fourth embodiment of the present invention. That is, as in the third embodiment, the present embodiment also uses the frequency-hopping EDCA. However, in the present invention, a CTS frame is transmitted in a different manner from that described in the third embodiment. The following description will focus on different aspects from the third embodiment.

It is assumed in the aforementioned third embodiment that only a VHT STA performs channel access. In this case, there is no need to consider NAV setting in a legacy STA. Therefore, in the aforementioned third embodiment, a CTS frame is transmitted through an entire bonding channel when the CTS frame is transmitted. By transmitting the CTS frame in such a manner, a channel load caused by transmission of the CTS frame can be reduce. However, if the CTS frame is transmitted through the entire bonding channel, the legacy STA cannot decode the CTS frame, and thus cannot set the NAV during a time period determined by the CTS frame. Accordingly, in the present embodiment, the CTS frame is transmitted by using one subchannel.

According to another aspect of the present embodiment, as described in the third embodiment, the CTS frame may be transmitted for each subchannel constituting the bonding channel. In this case, the CTS frame may include a subchannel list for indicating a specific subchannel for which each VHT STA has a transmission opportunity. For example, if transmission is allowed for one VHT STA, a list of subchannels that can be used by the VHT STA may be included in the CTS frame. Alternatively, if no subchannel list is included, the VHT STA may have a transmission opportunity for all subchannels.

Figure 8:
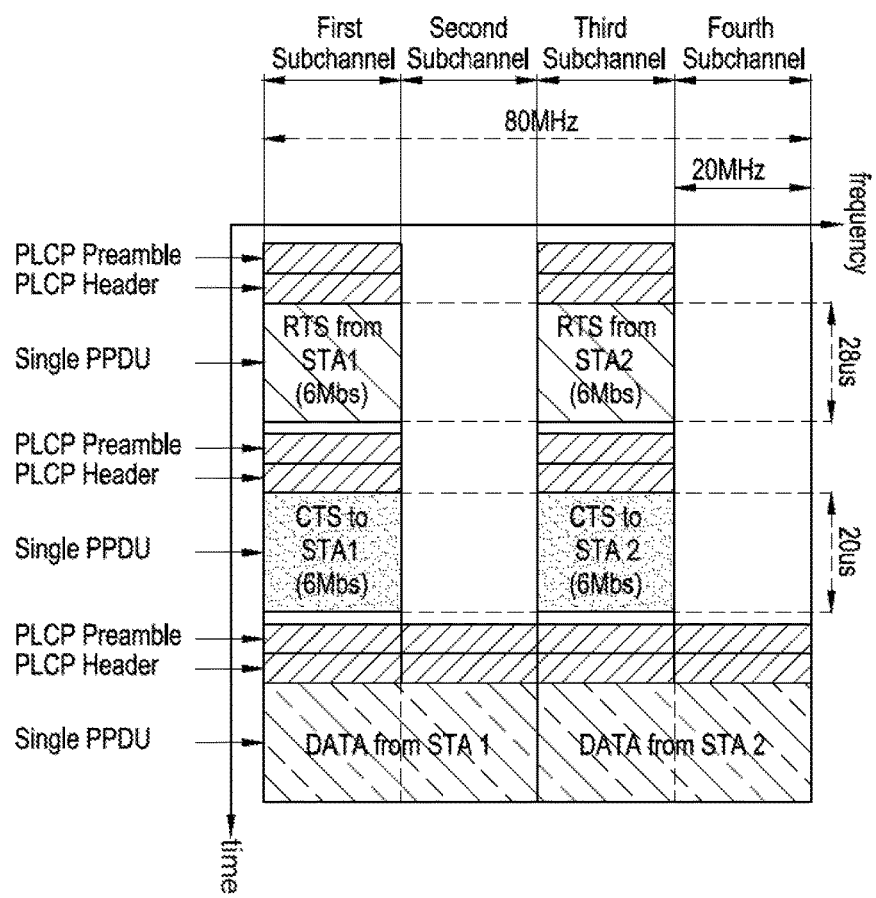
FIG. 8 is a diagram showing a channel access mechanism according to a fifth embodiment of the present invention.

FIG. 8 is a diagram showing a channel access mechanism in a VHT WLAN system according to a fifth embodiment of the present invention. The present embodiment is an example of a channel access mechanism for preventing collision between VHT STAs in a VHT system in which the VHT STA coexists with a legacy STA or in a VHT BSS in which only the VHT STA exists. The present embodiment can be regarded as an application of the aforementioned third and fourth embodiments. Such a channel access mechanism can also be referred to as, for example, frequency-hopping EDCA with dynamic channel allocation.

As in the third embodiment and the fourth embodiment, according to the channel access mechanism using the frequency-hopping EDCA, a destination VHT STA can simultaneously receive RTS frames from a plurality of UEs or can receive an additional RTS frame through an unused subchannel. In this case, the present embodiment allows several UEs to simultaneously transmit data or the like through different subchannels by respectively transmitting CTS frames to one or more UEs which have received the RTS frames. The CTS frame includes a list of subchannels to be used when a corresponding UE transmits data or the like.

Referring to FIG. 8, source VHT STAs or transmitting VHT STAs (indicated by 'STA1' and 'STA2' in FIG. 8), which intend to transmit data, transmit RTS frames through any respective subchannels. For example, this may be a case where backoff timers of the STA1 and the STA2 are simultaneously expired. It is shown in FIG. 8 that, to transmit an RTS frame, the STA1 uses a 1st subchannel and the STA2 uses a 3rd subchannel, which is for exemplary purposes only. According to the present embodiment, preferably, the STA1 and the STA2 transmit the RTS frames by using different subchannels, and the subchannels can be determined without any restriction. When the STA1 and the STA2 transmit the RTS frames by using different subchannels, collision between the RTS frames can be prevented. In FIG. 8, a process of transmitting the respective RTS frames by the STA1 and the STA2 through the different subchannels is indicated by a PLCP preamble, a PLCP header, and a single PPDU in the 1st and 3rd subchannels.

When the destination VHT STA or the receiving VHT STA receives separate RTS frames through 1st and 3rd subchannels among all subchannels, the destination VHT STA or the receiving VHT STA transmits a CTS frame as a response with respect to all received RTS frames. It is shown in FIG. 8 that two CTS frames are respectively transmitted to the STA1 and the STA2 through the 1st and 3rd subchannels for the respective RTS frames received from the STA1 and the STA2. In FIG. 8, a process of transmitting the CTS frame is indicated by a PLCP preamble, a PLCP header, and a single PPDU in each of the 1st and 3rd subchannels.

According to the present embodiment, a list of subchannels to be used by the STA1 to transmit subsequent data or the like is included in a CTS frame to be transmitted to the STA1. According to the present invention, 1st and 2nd subchannels are included in the list, which is for exemplary purpose only. In addition, the list of subchannels to be used by the STA2 to transmit subsequent data or the like is also included in a CTS frame to be transmitted to the STA2. According to the present embodiment, 3rd and 4th subchannels are included in the list, which is for exemplary purpose only.

Upon receiving the CTS frame, each of the STA1 and the STA2 transmits data or the like to the destination STA through a subchannel included in the subchannel list of the received CTS frame. The STA1 and the STA2 can simultaneously transmit the data or the like. In FIG. 8, a process of transmitting the data through 1st and 2nd subchannels of the 1st VHT STA and transmitting the data through 1st and 2nd subchannels of the 2nd VHT STA is indicated by a PLCP preamble, a PLCP header, and a single PPDU in the 1st and 2nd subchannels and the 3rd and 4th subchannels.

According to the embodiment of the present invention, a plurality of VHT STAs or a VHT STA and a legacy STA can transmit data or the like by using an entire bonding channel. In addition, according to the embodiment of the present invention in which a CTS frame includes a list of subchannels to be used, a VHT STA for using each subchannel can be adaptively determined by considering all conditions at the request of a plurality of VHT STAs. Therefore, according to the present embodiment, channel usage efficiency can be improved when transmitting data or the like.

What is claimed is:

1. A method for a wireless communication system, the method comprising:

receiving, by a first station, a plurality of request to send (RTS) frames from a second station through a plurality of subchannels, each of the plurality of RTS frames being received through a corresponding one of the plurality of subchannels, each of the plurality of subchannels having a 20 megahertz (MHz) bandwidth;

transmitting, by the first station, at least one clear to send (CTS) frame in response to at least one of the plurality of RTS frames to the second station, through at least one idle subchannel of the plurality of subchannels, each of the at least one CTS frame being transmitted through a corresponding one of the at least one idle subchannel; and receiving, by the first station, a data frame from the second station after transmitting the at least one CTS frame, wherein each of the at least one CTS frame includes channel information related to the at least one idle subchannel through which the at least one CTS frame is transmitted by the first station, and the data frame is received through the at least one idle subchannel indicated by the channel information, and wherein a number of the at least one idle subchannel through which the at least one CTS frame is transmitted is equal to or less than a number of the plurality of subchannels through which the plurality of RTS frames are received.

2. The method of claim 1, wherein the number of the at least one idle subchannel is 1, 2 or 4 when the number of the plurality of subchannels is 4.

3. The method of claim 1, wherein the number of the at least one idle subchannel is 1 or 2 when the number of the plurality of subchannels is 2.

4. A device comprising:
a transceiver; and
a processor operatively connected to the transceiver and configured to:
instruct the transceiver to receive a plurality of request to send (RTS) frames from a station through a plurality of subchannels, each of the plurality of RTS frames being received through a corresponding one of the plurality of subchannels, each of the plurality of subchannels having a 20 megahertz (MHz) bandwidth,
instruct the transceiver to transmit at least one clear to send (CTS) frame in response to at least one of the plurality of RTS frames to the station, through at least one idle subchannel of the plurality of subchannels, each of the at least one CTS frame being transmitted through a corresponding one of the at least one idle subchannel, and
instruct the transceiver to receive a data frame from the station after transmitting the at least one CTS frame,
wherein each of the at least one CTS frame includes channel information related to the at least one idle subchannel through which the at least one CTS frame is transmitted by the device, and the data frame is received through the at least one idle subchannel indicated by the channel information, and
wherein a number of the at least one idle subchannel through which the at least one CTS frame is transmitted is equal to or less than a number of the plurality of subchannels through which the plurality of RTS frames are received.

5. The device of claim 4, wherein the number of the at least one idle subchannel is 1, 2 or 4 when the number of the plurality of subchannels is 4.

6. The device of claim 4, wherein the number of the at least one idle subchannel is 1 or 2 when the number of the plurality of subchannels is 2.

7. A method for a wireless communication system, the method comprising:
receiving, by a first station, a plurality of request to send (RTS) frames from a second station through a plurality of subchannels, each of the plurality of RTS frames being received through a corresponding one of the plurality of subchannels, each of the plurality of subchannels having a 20 megahertz (MHz) bandwidth;
transmitting, by the first station, at least one clear to send (CTS) frame in response to at least one of the plurality of RTS frames to the second station through at least one idle subchannel of the plurality of subchannels, each of the at least one CTS frame being transmitted through a corresponding one of the at least one idle subchannel; and
receiving, by the first station, a data frame from the second station after transmitting the at least one CTS frame,
wherein each of the at least one CTS frame includes channel information related to all of the at least one idle subchannel through which the at least one CTS frame is transmitted by the first station, and the data frame is received through the at least one idle subchannel indicated by the channel information, and
wherein a number of the at least one idle subchannel through which the at least one CTS frame is transmitted is equal to or less than a number of the plurality of subchannels through which the plurality of RTS frames are received.

8. The method of claim 7, wherein the number of the at least one idle subchannel is 1, 2 or 4 when the number of the plurality of subchannels is 4.

9. The method of claim 7, wherein the number of the at least one idle subchannel is 1 or 2 when the number of the plurality of subchannels is 2.

10. A device comprising:
a transceiver; and
a processor operatively connected to the transceiver and configured to:
instruct the transceiver to receive a plurality of request to send (RTS) frames from a station through a plurality of subchannels, each of the plurality of RTS frames being received through a corresponding one of the plurality of subchannels, each of the plurality of subchannels having a 20 megahertz (MHz) bandwidth,
instruct the transceiver to transmit at least one clear to send (CTS) frame in response to at least one of the plurality of RTS frames to the station through at least one idle subchannel of the plurality of subchannels, each of the at least one CTS frame being transmitted through a corresponding one of the at least one idle subchannel, and
instruct the transceiver to receive a data frame from the station after transmitting the at least one CTS frame,
wherein each of the at least one CTS frame includes channel information related to all of the at least one idle subchannel through which the at least one CTS frame is transmitted by the device, and the data frame is received through the at least one idle subchannel indicated by the channel information, and
wherein a number of the at least one idle subchannel through which the at least one CTS frame is transmitted is equal to or less than a number of the plurality of subchannels through which the plurality of RTS frames are received.

11. The device of claim 10, wherein the number of the at least one idle subchannel is 1, 2 or 4 when the number of the plurality of subchannels is 4.

12. The device of claim 10, wherein the number of the at least one idle subchannel is 1 or 2 when the number of the plurality of subchannels is 2.

13. A method for a wireless communication system, the method comprising:
- receiving, by a first station, a plurality of request to send (RTS) frames from a second station through a plurality of subchannels, each of the plurality of RTS frames being received through a corresponding one of the plurality of subchannels, each of the plurality of subchannels having a 20 megahertz (MHz) bandwidth;
- transmitting, by the first station, a plurality of clear to send (CTS) frames in response to at least one of the plurality of RTS frames to the second station through a plurality of idle subchannels of the plurality of subchannels, each of the plurality of CTS frames being transmitted through a corresponding one of the plurality of idle subchannels; and
- receiving, by the first station, a data frame from the second station after transmitting the plurality of CTS frames,
- wherein each of the plurality of CTS frames includes channel information related to the plurality of idle subchannels through which the plurality of CTS frames are transmitted by the first station, and the data frame is received through the plurality of idle subchannels indicated by the channel information, and
- wherein a number of the plurality of idle subchannels through which the plurality of CTS frames are transmitted is equal to or less than a number of the plurality of subchannels through which the plurality of RTS frames are received.

14. The method of claim 13, wherein the number of the plurality of subchannels is 4.

15. A device comprising:
- a transceiver; and
- a processor operatively connected to the transceiver and configured to:
- instruct the transceiver to receive a plurality of request to send (RTS) frames from a second station through a plurality of subchannels, each of the plurality of RTS frames being received through a corresponding one of the plurality of subchannels, each of the plurality of subchannels having a 20 megahertz (MHz) bandwidth;
- instruct the transceiver to transmit a plurality of clear to send (CTS) frames in response to at least one of the plurality of RTS frames to the second station through a plurality of idle subchannels of the plurality of subchannels, each of the plurality of CTS frames being transmitted through a corresponding one of the plurality of idle subchannels; and
- instruct the transceiver to receive a data frame from the second station after transmitting the plurality of CTS frames,
- wherein each of the plurality of CTS frames includes channel information related to the plurality of idle subchannels through which the plurality of CTS frames are transmitted by the device, and the data frame is received through the plurality of idle subchannels indicated by the channel information, and
- wherein a number of the plurality of idle subchannels through which the plurality of CTS frames are transmitted is equal to or less than a number of the plurality of subchannels through which the plurality of RTS frames are received.

16. The device of claim 15, wherein the number of the plurality of subchannels of 4.

* * * * *